_United States Patent_ [19]

Courtright et al.

[11] Patent Number: 4,931,295
[45] Date of Patent: Jun. 5, 1990

[54] CHEWING GUM CONTAINING HIGH-POTENCY SWEETENER PARTICLES WITH MODIFIED ZEIN COATING

[75] Inventors: Steven B. Courtright, Evanston; Kevin F. Barrett, Darien, both of Ill.

[73] Assignee: Wm. Wrigley Jr. Company, Chicago, Ill.

[21] Appl. No.: 279,215

[22] Filed: Dec. 2, 1988

[51] Int. Cl.⁵ .............................................. A23G 3/30
[52] U.S. Cl. ........................................ 426/5; 426/96; 426/548; 426/302; 426/307
[58] Field of Search ................ 426/96, 5, 548, 804, 426/302, 307

[56] References Cited

U.S. PATENT DOCUMENTS

| | | | |
|---|---|---|---|
| Re. 29,682 | 6/1978 | Cella et al. | 426/548 |
| 3,262,788 | 7/1966 | Swanson et al. | 99/199 |
| 3,753,739 | 8/1973 | Cella et al. | 99/141 |
| 3,922,354 | 11/1975 | Galluzzi et al. | 426/96 |
| 3,928,633 | 12/1975 | Shoaf et al. | 426/96 |
| 3,956,507 | 5/1976 | Shoaf et al. | 426/96 |
| 3,962,468 | 6/1976 | Pischke et al. | 426/96 |
| 4,004,039 | 1/1977 | Shoaf et al. | 426/548 |
| 4,059,706 | 11/1977 | Pischke et al. | 426/548 |
| 4,139,639 | 2/1979 | Bahoshy et al. | 426/3 |
| 4,230,687 | 10/1980 | Sair et al. | 424/22 |
| 4,269,860 | 5/1981 | Ogawa et al. | 426/5 |
| 4,384,004 | 5/1983 | Cea et al. | 426/3 |
| 4,384,005 | 5/1983 | McSweeney | 426/250 |
| 4,495,213 | 1/1985 | Wolf et al. | 426/548 |
| 4,497,835 | 2/1985 | Winston | 426/72 |
| 4,517,214 | 5/1985 | Shoaf et al. | 426/548 |
| 4,554,167 | 11/1985 | Sorge et al. | 426/285 |
| 4,556,565 | 12/1985 | Arima et al. | 426/3 |
| 4,568,560 | 2/1986 | Schobel | 427/3 |
| 4,579,747 | 4/1986 | Sugiyama et al. | 426/548 |
| 4,597,970 | 7/1986 | Sharma et al. | 426/5 |
| 4,634,593 | 1/1987 | Stroz et al. | 426/5 |

FOREIGN PATENT DOCUMENTS

| | | |
|---|---|---|
| 675004 | 11/1963 | Canada . |
| 86810619 | 10/1986 | European Pat. Off. . |
| 87300375 | 4/1987 | European Pat. Off. . |
| 87301903 | 7/1987 | European Pat. Off. . |
| 58-157509 | 7/1983 | Japan . |
| 59-95862 | 12/1984 | Japan . |
| 1274905 | 5/1972 | United Kingdom . |
| 1301770 | 1/1973 | United Kingdom . |

_Primary Examiner_—Jeanette Hunter
_Attorney, Agent, or Firm_—Willian Brinks Olds Hofer Gilson & Lione

[57] ABSTRACT

The present invention is a method for producing a chewing gum with a zein coated delayed release high-potency sweetener. In accordance with the invention, the zein coating is modified so as to be softer so that the sweetener particles are less crunchy and perceptible in the chewing gum. The process beings by mixing a quantity of zein, solvent for the zein, and a water soluble modified cellulose compound, such as hydroxypropyl methylcellulose, together to form a modified zein solution. The amount of the inclusion material is preferably about 5 to about 40 percent by weight of the zein. This modified zein solution is applied to a high-potency sweetener and then dried to produce the delayed release sweetener particles. These particles are then added to a chewing gum formulation.

31 Claims, No Drawings

CHEWING GUM CONTAINING HIGH-POTENCY SWEETENER PARTICLES WITH MODIFIED ZEIN COATING

BACKGROUND OF THE INVENTION

The present invention relates to methods for producing chewing gum. More particularly, the invention relates to methods for producing chewing gum containing high-potency sweetener particles which have been coated with zein to enhance shelf-life stability and/or delayed release.

In recent years, efforts have been devoted to controlling the release characteristics of various ingredients in chewing gum. Most notably, attempts have been made to delay the release of sweeteners and flavors in various chewing gum formulations to thereby lengthen the satisfactory chewing time of the gum. Delaying the release of sweeteners and flavors can also avoid an undesirable overpowering burst of sweetness or flavor during the initial chewing period. On the other hand, some ingredients have been treated so as to increase their rate of release in chewing gum.

In addition, other efforts have been directed at protecting high-potency sweeteners within the chewing gum formulation, to thereby increase the shelf-stability of the ingredient, i.e. the protection against degradation of the high-potency sweetener over time.

For example, U.S. Pat. No. 4,597,970 to Sharma et al., teaches a process for producing an agglomerated sweetener wherein the sweetener is dispersed in a hydrophobic matrix consisting essentially of lecithin, a glyceride, and a fatty acid or wax having a melting point between 25° and 100° C. The method disclosed uses a spray congealing step to form the sweetener-containing matrix into droplets followed by a fluid bed second coating on the agglomerated particles.

U.S. Pat. Nos. 4,515,769 and 4,386,106, both to Merrit et al., teach a two step process for preparing a delayed release flavorant for chewing gum. In this process, the flavorant is prepared in an emulsion with a hydrophyllic matrix. The emulsion is dried and ground and the particles are then coated with a water impermeable substance.

U.S. Pat. No. 4,230,687, to Sair et al., teaches a process for encasing an active ingredient to achieve gradual release of the ingredient in a product such as chewing gum. The method described involves adding the ingredient to an encapsulating material in the form of a viscous paste. High shear mixing is used to achieve a homogeneous dispersion of the ingredient within the matrix which is subsequently dried and ground.

U.S. Pat. No. 4,139,639, to Bahoshy et al., teaches a process of "fixing" aspartame by co-drying (by spray drying or fluid bed coating) a solution containing aspartame and an encapsulating agent, such as gum arabic, to thereby surround and protect the aspartame during storage in the gum.

U.S. Pat. No. 4,673,577 to Patel teaches a process wherein high-potency sweeteners are encapsulated with food grade shellac.

U.S. Pat. No. 4,384,004, to Cea et al., teaches a method of encapsulating aspartame with various encapsulating agents, including zein, by various encapsulation techniques, such as spray drying, in order to increase the shelf-stability of the aspartame.

Co-pending U.S. patent application Ser. No. 134,948 filed on Dec. 18, 1987, assigned to the assignee of the present invention, discloses a novel process of applying zein as a second coating to high-potency sweeteners for chewing gum.

Zein is a protein of the prolamine class which is derived from corn. In the past, zein has found many uses as a coating material. For example, the co-pending application reports the surprising result of increased stability of dipeptide sweeteners in aldehyde flavor containing chewing gums when the sweetener particles receive a coating of zein as a second coat.

Unfortunately, a potential disadvantage of using zein as a coating material for high-potency sweeteners in chewing gum is that zein tends to form a relatively hard and crunchy coating. As a consequence, zein coated particles above a certain size can impart a grainy texture, or grittiness, to the chewing gum. Because the zein coating is relatively frangible, any grittiness generally passes quickly as the zein is broken into smaller pieces by chewing. However, even a momentary grittiness in the chewing gum can lead to customer dissatisfaction.

Although much of the problem with grittiness may be overcome by using smaller particles, it is noted that the particle size is important in determining the exact release profile of coated high-potency sweetener. Thus, while the desire to overcome grittiness may dictate the use of smaller zein coated particles, a certain delayed release profile may dictate the use of larger particles.

SUMMARY OF THE INVENTION

The present invention is a method for producing a chewing gum with a zein coated delayed release high-potency sweetener. In accordance with the invention, the zein coating is modified so as to be softer so that the sweetener particles are less crunchy and thus less perceptible in the chewing gum.

Briefly stated, the process begins by mixing a quantity of zein, a solvent for the zein, and a water soluble modified cellulose compound together to form a modified zein solution. This modified zein solution is applied to a high-potency sweetener and then dried to produce the delayed release sweetener particles. These particles are then added to a chewing gum formulation.

In accordance with a first preferred method of the present invention, the high-potency sweetener is the dipeptide sweetener generally known as aspartame. Also in this preferred embodiment, the zein is dissolved in water having a pH of between about 11.5 and about 12.1 and contains about 13 weight percent zein. Hydroxypropyl methylcellulose is added to this solution at about 2 percent by weight of the solution, i.e. about 15 percent by weight of the zein. This aqueous zein and HPMC solution is added in an amount between about 15 and about 45 percent by weight of the damp mix created with the aspartame. As a result, the final zein coated aspartame is preferably between about 4 and about 25 weight percent zein, and between about 0.2 and about 10 percent HPMC. In this embodiment, the chewing gum made is a mint flavored gum with between about 0.1 and about 0.5 weight percent of the coated aspartame.

In accordance with a second preferred method of the present invention, the zein is dissolved in ethanol to between about 10 and about 50 percent by weight of the solution. Hydroxypropyl cellulose is used as the modified cellulose compound in this second preferred embodiment. The modified ethanol zein solution is added to powdered aspartame in amount of between about 15 and about 45 percent of the damp mix. After drying and grinding, the particles are between about 10 and about 35 percent by weight zein.

An advantage of the present invention is that when the water soluble modified cellulose compound is incorporated into the zein coating, it has been found that the zein coating is thereby softened. As a result, the high-potency sweetener particles made with the modified zein coating of the present invention, are less crunchy and thus less perceptible in chewing gum.

While not wishing to be bound by any particular theory, it is believed that the water soluble modified cellulose compound is particularly beneficial because it tends to at least partially swell and/or dissolve upon hydration during initial chewing. Consequently, the zein coating is weakened at the appropriate time.

The present invention is also advantageous in that it allows the chewing gum manufacturer to use zein coated particles of a size that would otherwise be large enough to cause grittiness in the chewing gum.

Although the present invention may be carried out in a continuous process, it is also well suited for batch processing. This is particularly advantageous in view of the small quantities of the high-potency sweeteners typically used for chewing gum formulations.

It should be noted that the phrase "delayed release" as used in this application is intended to refer to a delayed release of the high-potency sweetener during chewing of the gum as well as the delayed, or prevented, release of the high-potency sweetener in the chewing gum during storage, i.e. protecting the ingredient from the other components of the chewing gum during storage. The phrase "shelf-stability" is intended to refer the resistance to degradation of the high-potency sweetener in the chewing gum over time.

It should also be noted that the phrase "modified zein coating" as used herein is intended to refer to a coating comprising zein and the water soluble modified cellulose compound. Likewise, the phrase "modified zein solution" is intended to refer to a solution comprising zein and the water soluble modified cellulose compound.

It should further be noted that the term "solution" is intended to refer to a mixture of solvent and zein and/or water soluble modified cellulose compound wherein either the zein is completely dissolved, or wherein a major portion of the zein is dissolved and the remaining minor portion is suspended in the solvent. It has been found to be not necessary for the water soluble modified cellulose compound to dissolve in the solvent used to make the modified zein solution.

These advantages of the present invention described above as well as others will become apparent from the following description which, when taken in conjunction with the accompanying figures, discloses presently preferred methods of the present invention.

DETAILED DESCRIPTION OF THE PREFERRED EMBODIMENTS

The first preferred embodiment begins by preparing an aqueous solution of zein.

Zein is a protein of the prolamine class derived from corn. Typically, zein is obtained in a powdered form and is yellow, tasteless and is generally known to be insoluble in water and soluble in alcohols. In the most preferred embodiment, the zein is obtained from the Freeman Company.

Zein has been known in the past to be used as a coating material. However, in these uses, the zein was typically dissolved in ethyl alcohol. Naturally, the use of ethyl alcohol requires the installation of additional equipment to reduce the danger from explosions, fire, or toxic effects.

This first embodiment avoids these problems by using zein in an aqueous solution. An aqueous solution of zein is made possible by virtue of the fact that the aqueous solution is maintained at a relatively high pH, i.e. between about 11.5 and about 12.1. In this pH range, it has been found that the zein is significantly more soluble than in neutral water. Typically, when mixed with neutral water, zein powder will float on the top of the water without any appreciable solution, or even suspension of the zein within the water. Accordingly, it is not possible to coat particles with a solution of zein in neutral water.

In contrast, when mixed into water which has a pH between about 11.5 and 12.1, it is possible to get significant solution and suspension of zein particles within the water. In particular, it has been found that an aqueous solution of zein can be formed which contains up to 25 percent by weight zein. At this 25 percent level, the major portion of the zein is solvated with only a minor portion being suspended within the solution.

The aqueous solution of zein is prepared by adding the desired amount of zein to a quantity of water along with an amount of base sufficient to create a pH between about 11.5 and about 12.1. Preferably, sodium hydroxide is added to the water in sufficient quantity to create a pH between 11.6 and 11.9. It is preferred to add the zein and base simultaneously in increments while stirring. Alternatively, either the zein or the base can be added to the water before the other. Alternatively, other food acceptable bases can be used.

Generally, the aqueous zein solution should contain between about 1 and about 25 percent by weight zein. Preferably, the zein solution should have a zein content between about 5 and about 20 percent by weight. More preferably, the zein content will be between about 11 and about 15 percent by weight, most preferably about 13 percent by weight. As noted above, this zein content is higher than would be available without the high pH level of the water.

An amount of a water soluble modified cellulose compound is added to the zein, either before, or preferably after, the zein is added to the high pH water. Preferably, the water soluble modified cellulose compound is selected from the group consisting of hydroxypropyl methyl cellulose and hydroxypropyl cellulose as well as combinations thereof. Most preferably, the water soluble modified cellulose compound used in this first preferred embodiment is the modified cellulose known as hydroxypropyl methylcellulose (HPMC). A suitable HPMC can be purchased from DOW CHEMICAL under the designation "E5".

Preferably, the amount of water soluble modified cellulose compound is selected to be between about 5 and about 40 percent by weight of the zein. More preferably, the amount of water soluble modified cellulose compound is between about 10 and about 20 percent by weight of the zein, and most preferably about 15 percent. Generally, the amount of water soluble modified cellulose compound is selected so as to provide the maximum degree of softness while maintaining a sufficient integrity of the zein coating. In other words, if more than about 50 weight percent of water insoluble inclusion material is added, it can interfere with the stabilizing ability of the zein.

In some embodiments of the present invention, it is desirable to include a colorant with the modified zein solution. In this way, the coated sweetener particles can be made to blend in with the color of the gum. For example, in a preferred cinnamon flavored chewing gum which is orange-red in color, about 0.044 percent Red No. 40 dye and about 0.044 percent Yellow No. 6 dye, is added to the zein solution. In alternative embodiments, a colorant may be added so that the coated sweetener particles contrast with the color of the gum to thereby give a speckled appearance.

The preferred method of applying the modified zein solution to the powdered high-potency sweetener is by a damp mix granulation method such as that described in co-pending U.S. Patent Application identified above. Alternatively, other coating techniques can be used, such as fluidized bed coating or spray drying.

In accordance with this damp mix method, a quantity of powdered high-potency sweetener is added to the bowl of a planetary type mixer. The high-potency sweetener can be selected from a variety of high-potency sweeteners, such as aspartame, alitame, acesulfame K, sucralose, saccharine and its salts, cyclamic acid and its salts, dihydrochalcones, thaumatin, and monellin, etc.

Most preferably the high-potency sweetener used in this invention is a dipeptide sweetener, such as aspartame or alitame. Most preferably, the dipeptide sweetener is aspartame, i.e. the methyl ester of L-aspartyl L-phenylalanine. The aspartame used in the most preferred embodiment, is obtained from the NUTRASWEET Company under their designation "NutraSweet ®." This is a powdered form with generally needle shaped crystals having a wide range of particle sizes.

In alternatively preferred embodiments, the dipeptide high-potency sweetener is L-aspartyl-D-alanine 2,2,4,4 tetramethyl-thienyl-amide, generally known as alitame.

In other alternatively preferred embodiments, the high-potency sweetener is the potassium salt of 6-methyl-1.2.3-oxathiazin-4(3H)-one-2.2-dioxide, generally known as acesulfame K.

The present invention also contemplates the simultaneous use of more than one high-potency sweetener. That is, two or more high-potency sweeteners may be mixed together before or during the present process. In some embodiments, it may be desirable to blend two different sweeteners in order to obtain the most desirable sweetness profile for the chewing gum. It is known in the art to combine different high-potency sweeteners to mask undesirable aftertastes, and the like.

It is also contemplated within the present invention to combine a bulking agent with the high-potency sweetener before it is coated by the present process. This is particularly desirable when working with a high-potency sweetener such as thaumatin or monellin which have such a high sweetness per gram ratio.

A limited amount of the modified zein solution is next added to the high-potency sweetener in the mixing bowl. The amount of modified zein solution added will depend on the zein content of the solution and the desired amount of zein to be coated on the high-potency sweetener at the conclusion of the process.

Also, the amount of modified zein solution is intentionally limited so as to produce a damp, dust-free, non-flowable, non-extrudable, crumbly mixture. By the word "crumbly" it is meant that the damp mix easily separates from itself. By way of comparison, the damp mix should have the consistency and texture of wet sand. By way of contrast, the damp mix should not have so much solution that it becomes dough-like, paste-like, clay-like, or soup-like. It has been found that, if the mix does go to the dough-like stage, many of the advantages of this preferred embodiment are lost. In particular, the dough-like mix is more difficult to mix, handle, and dry and considerably more difficult to achieve the desired particle sizes.

The preferred method of adding the modified zein solution to the high-potency sweetener is to add it in small amounts in time spaced increments while continuously mixing. When adding the solution this way, it is desirable to allow the mix to become homogeneous before the next addition of solution. In following this preferred method, the solution is allowed to be absorbed slowly into the mixture without producing pools of solution which can result in large clay-like lumps in the mixture.

It has been found that one method of determining when there is sufficient solution added is to monitor the power demand for the mixer. In particular, the power demand increases dramatically as the mix goes from the desired damp mix stage to a dough-like stage. This is believed to be due to the fact that, in the desired damp mix stage, the mix is crumbly, i.e. easily separable; whereas when the mix moves into the clay-like stage, the mix become more cohesive. As a result, the power demand on the mixer can be monitored and the solution addition stopped just as the power demand begins a sharp rise.

It is also possible to determine the proper amount of solution to add by visually monitoring the condition of the damp mix. The characteristics mentioned above, namely dust-free, non-flowable, and crumbly, are relatively easy to observe and contrast with the cohesiveness, and flowability of the dough-like stage.

Naturally, once the optimum amount of solution is determined for a particular zein content level and a particular weight ratio of zein to high-potency sweetener, that optimum amount of solution will be reproducible.

In this first preferred embodiment, the modified zein solution is added so as to comprise between about 15 and about 45 percent by weight of the damp mix, more preferably between about 20 and about 40 percent, and most preferably about 33 percent.

In selecting the relative proportion of modified zein coating to high-potency sweetener in the final product, some factors to consider are the specific high-potency sweetener selected and the release profile and/or shelf-stability which is being sought for the sweetener in the particular chewing gum. Generally, using more zein will result in better shelf-stability of the high-potency sweetener and longer release times when the gum is chewed.

Naturally, the amount of zein should be kept below the level at which it would adversely affect the texture of the chewing gum. However, as noted above, because the present invention has the effect of softening the zein coating during, the amount of zein can be increased without affecting the texture of the gum.

Preferably, the zein will comprise between about 1 and about 15 weight percent of the coated high-potency sweetener, i.e. percent by combined weight of the high-potency sweetener, the zein, and the water soluble modified cellulose compound. In the most preferred embodiment, the zein is added to between about 2 and about 7 percent by weight of the agglomerated high-potency sweetener, even more preferably about 4 percent. Preferably, the release sweetener particles comprise between about 70 and about 96 weight percent high-potency sweetener.

After the last of the modified zein solution is added, the mixture is continuously mixed for a time sufficient to produce a homogenous mass. In particular, the solvated and unsolvated high-potency sweetener, the solvated and unsolvated zein, the solvated and unsolvated water soluble modified cellulose compound, and any free solvent should all be evenly dispersed in the mix. The optimum time of mixing can be determined visually.

The type of mixing affected on the mix is believed to be important in this preferred embodiment of the present invention. In particular, it is believed that a compressive type mixing is important in order to push the solvated zein and the particles of high-potency sweetener together into clusters. This is contrasted with a high shear type mixing which would act to separate the components of the damp mix. Accordingly, the preferred type of mixer is a planetary mixer or other type mixer that would give similarly compressive type mixing.

After the final mixing, the damp mix is dried. Preferably, substantially all of the water will be removed from the mix. The drying is preferably accomplished by taking the damp mix out of the mixer bowl and spreading it on drying trays. It been found preferable to line the drying trays with paper to facilitate removal of the dried product. In the most preferred embodiment, the damp mix is spread on trays at a depth of about 1 to 2 cm.

The trays are then preferably placed in a drying oven at a temperature and for a time sufficient to drive off substantially all of the water. Naturally, the temperature and time for drying will depend on the amount of water used in the mixture as well as factors such as the thermal or moisture stability of the high-potency sweetener. Accordingly, it may be desirable to allow the damp mix to dry at ambient conditions. In the most preferred embodiment, the aspartame coated with 13 weight percent zein is dried at about 170° for 16 to 20 hours.

After drying in this first preferred embodiment, the coated aspartame has been found to have a water content of between about 2 and 5 percent by weight of the total. The acceptable level of water left in the agglomerated high-potency sweetener particles may be higher or lower than this amount and will depend on the nature of the high-potency sweetener. Naturally, if the high-potency sweetener is subject to deterioration in the presence of water, it is important to drive off as much of the solution as possible. For example, aspartame is known to be less stable in the presence of moisture. Accordingly, in the preferred embodiment using aspartame as the high-potency sweetener, it is desirable to drive off as much of the water as feasible.

After drying, the mix is generally characterized as being in the form of hard, dry lumps of various shapes and sizes. At this point, the dry mix is ready to be treated to produce the desired range of particle sizes. This can be accomplished in various ways. Most preferably, the dried mix is fed into a grinder which comminutes the mix into smaller particles. Other devices such as a roller mill can also be used to comminute the dried mix. The grinder or other device is preferably equipped with a screen which will pass the desired particle size range. If desired, other techniques such as a second screen or a cyclone separator can be used to ensure a minimum particle size as well as a maximum particle size. Preferably, a screen with 0.04 inch holes is used to produce the aspartame particles of this first preferred embodiment.

In this first preferred embodiment, only the maximum particle size is controlled. That is, the smaller particles are not held back. As a result, there may be small unbonded sweetener crystals in addition to larger clusters of coated particles. This result is believed to be preferable for particular high-potency sweeteners in certain gum formulations. For example, in this first preferred embodiment, this is believed to produce the effect of allowing some smaller and/or unbonded particles of the aspartame to be released more quickly when the gum is chewed than the aspartame which is bound in the clusters. As a result, the release profile is such that the consumer experiences sufficient sweetness initially and also subsequently.

In this first preferred embodiment, the ground particles that pass through a 30 U.S. mesh screen are used. The particles retained on the 30 mesh screen are reground. Of the particles passing through the 30 mesh screen, 24 weight percent are retained on a 40 mesh screen, 41 weight percent are retained on a 60 mesh screen, 21 weight percent are retained on a 100 mesh screen, 13.5 weight percent are retained on a 200 mesh screen, 0.5 weight percent pass through a 200 mesh screen.

In alternative embodiments, it may be desirable to control the maximum and the minimum particle size to produce a narrower range of particle sizes. This may be desired when it is intended for all of the high-potency sweetener to have a more uniform delayed release.

At this point, the above-described zein coated high-potency sweetener is ready to be incorporated into a chewing gum. The remainder of the chewing gum ingredients are seen to be noncritical to the present invention. That is, the particles of high-potency sweetener with the modified zein coating can be incorporated into conventional chewing gum formulations in a conventional manner.

Naturally, the preferred chewing gum formulation is a sugarless chewing gum. However, the high-potency sweeteners may also be used in a sugar chewing gum to intensify and/or extend the sweetness thereof. The zein coated high-potency sweetener may be used in either regular chewing gum or bubble gum.

In general, a chewing gum composition typically comprises a water soluble bulk portion and a water insoluble chewable gum base portion and, typically water insoluble flavoring agents. The water soluble portion dissipates with a portion of the flavoring agent over a period of time during chewing. The gum base portion is retained in the mouth throughout the chew.

The insoluble gum base generally comprises elastomers, resins, fats and oils, waxes, softeners and inorganic fillers. Elastomers may include polyisobutylene, isobutylene-isoprene copolymer, styrene butadiene rubber as well as natural latexes such as chicle. Resins include polyvinylacetate and terpene resins. Fats and oils may also be included in the gum base, including tallow, hydrogenated and partially hydrogenated vegetable oils, and cocoa butter. Commonly employed waxes include paraffin, microcrystalline and natural waxes such as beeswax and carnauba. According to the preferred embodiment of the present invention the insoluble gum base constitutes between about 5 to about 95 percent by weight of the gum. More preferably the insoluble gum base comprises between 10 and 50 percent by weight of the gum and most preferably about 20 to about 35 percent by weight of the gum.

The gum base typically also includes a filler component. The filler component such as calcium carbonate, magnesium carbonate, talc, dicalcium phosphate and the like. The filler may constitute between about 5 to about 60 percent by weight of the gum base. Preferably, the filler comprises about 5 to about 50 percent by weight of the gum base.

Gum bases typically also contain softeners, including glycerol monostearate and glycerol triacetate. Further, gum bases may also contain optional ingredients such as antioxidants, colors, and emulsifiers. The present invention contemplates employing any commercially acceptable gum base.

The water soluble portion of the chewing gum may further comprises softeners, sweeteners, flavoring agents and combinations thereof. Softeners are added to the chewing gum in order to optimize the chewability and mouth feel of the gum. Softeners, also known in the art as plasticizers or plasticizing agents, generally constitute between about 0.5 to about 15.0 percent by weight of the chewing gum. Softeners contemplated by the present invention include glycerin, lecithin, and combinations thereof. Further, aqueous sweetener solutions such as those containing sorbitol, hydrogenated starch hydrolysates, corn syrup and combinations thereof may be used as softeners and binding agents in gum.

As mentioned above, the coated high-potency sweeteners of the present invention will most likely be used in sugarless gum formulations. However, formulations containing sugar are also within the scope of the invention. Sugar sweeteners generally include saccharide containing components commonly known in the chewing gum art which comprise but are not limited to sucrose, dextrose, maltose, dextrin, dried invert sugar, fructose, levulose, galactose, corn syrup solids, and the like, alone or in any combination.

The zein coated high-potency sweeteners of the present invention can also be used in combination with other sugarless sweeteners. Generally sugarless sweeteners include components with sweetening characteristics but are devoid of the commonly known sugars and comprise but are not limited to sugar alcohols such as sorbitol, mannitol, xylitol, hydrogenated starch hydrolysates, maltitol, and the like, alone or in any combination.

Depending on the particular sweetness release profile and shelf-stability needed, the zein coated high-potency sweeteners of the present invention can also be used in combination with uncoated high-potency sweeteners or with high-potency sweeteners coated with other materials and by other techniques.

A flavoring agent may be present in the chewing gum in an amount within the range of from about 0.1 to about 10.0 weight percent and preferably from about 0.5 to about 3.0 weight percent of the gum. The flavoring agents may comprise essential oils, synthetic flavors, or mixture thereof including but not limited to oils derived from plants and fruits such as citrus oils, fruit essences, peppermint oil, spearmint oil, clove oil, oil of wintergreen, anise, and the like. Artificial flavoring components are also contemplated. Those skilled in the art will recognize that natural and artificial flavoring agents may be combined in any sensorally acceptable blend. All such flavors and flavor blends are contemplated by the present invention.

It has been known in the past that aspartame is degraded with a resultant loss in sweetness when used unprotected in the presence of an aldehyde containing flavor component, such as cinnamon oil. As reported in the above-identified co-pending U.S. Patent Application, it has been observed that applying a coating of zein onto an already coated particle of a dipeptide sweetener can significantly enhance the stability of the dipeptide sweetener in the presence of these aldehyde containing flavor components.

Thus, in view of this observation, an alternatively preferred embodiment is a chewing gum which includes an aldehyde containing flavor component. In this alternative embodiment, the high-potency sweetener is aspartame which has been previously coated with HPMC in a damp mix granulation process.

Examples of aldehyde containing flavoring agents include, but are not limited to, cinnamon oil which includes cinamaldehyde, cherry flavor which includes benzaldehyde, lemon flavor which includes citral and citronellal, vanilla flavor which includes vanillin and ethyl vanillin, fruit flavor which includes acetaldehyde, orange flavor which includes undecanol and dodecenal. Other flavors which include aldehyde containing components can be found on pages 325–328 of the book *Flavor Technology: Profiles, Products, Applications*, authored by Henry B. Heath, M.B.E., B. Pharm. and published in 1978 by The AVI Publishing Co., Inc. of Westport, Conn., which pages are incorporated herein by reference. The most popular aldehyde containing flavor used in chewing gum is a cinnamon flavor, which includes cinamaldehyde.

Optional ingredients such as colors, emulsifiers and pharmaceutical agents may be added to the chewing gum.

In general, chewing gum is manufactured by sequentially adding the various chewing gum ingredients to a commercially available mixer known in the art. After the ingredients have been thoroughly mixed, the gum mass is discharged from the mixer and shaped into the desired form such as by rolling into sheets and cutting into sticks, extruding into chunks or casting into pellets.

Generally, the ingredients are mixed by first melting the gum base and adding it to the running mixer. The base may also be melted in the mixer itself. Color or emulsifiers may also be added at this time. A softener such as glycerin may also be added at this time along with syrup and a portion of bulking agent. Further portions of the bulking agent may then be added to the mixer. A flavoring agent is typically added with the final portion of the bulking agent. The twice coated sweetener of the present invention is preferably added after the final portion of bulking agent and flavor have been added.

The entire mixing procedure typically takes from five to fifteen minutes, but longer mixing times may sometimes be required. Those skilled in the art will recognize that many variations of the above described procedure may be followed.

Turning now to a description of the second preferred embodiment of the present invention, this embodiment is similar in all respects to the first preferred embodiment with the exception that the zein is dissolved in ethanol rather than high pH water. In particular, the zein powder is dissolved in 95% pure food grade ethanol, such as that available from the AAPER Alcohol and Chemical Co. under the designation "Ethyl Alcohol - U.S.P. 95%, 190 Proof." Preferably, this ethanol/zein solution will be between about 10 and about 50 percent by weight zein, more preferably between about 20 and about 45, and most preferably about 35. The zein content of this ethanol solution may be varied depending on the amount of zein which is desired to be present in the final delayed release particles of high-potency sweetener.

Preferably, the water soluble modified cellulose compound in this second preferred embodiment is selected from the same group as that provided above. Most preferably, hydroxypropyl cellulose is used. In this second preferred embodiment, the amount of water soluble modified cellulose compound should be between about 4 and about 16 percent by weight of the zein, most preferably between about 5 and about 11 percent.

The amount of modified ethanol/zein solution which is added to the coated particles is preferably between about 5 and about 50 percent by weight of the damp mix, more preferably between about 10 and about 40, and most preferably about 33. As in the first preferred embodiment, the amount of modified zein solution is limited so as to produce a damp, dust-free, non-flowable, non-extrudable, crumbly mixture.

This damp mix is spread on trays as above and dried to remove substantially all of the ethanol. Naturally, the temperature and drying times are lower when ethanol is used. In particular, the drying temperature is set at about 150° and the mix is dried for about 12 hours.

EXAMPLES

The following examples of the invention and comparative examples are provided by way of explanation and illustration. Examples 1 through 3 were produced according to the present invention. Examples 4 and 5 were performed as comparative examples.

Example 1 was carried out in accordance with the first preferred embodiment. In particular, a modified zein solution was prepared which consisted of 13 weight percent zein and 2 weight percent hydroxypropyl methyl cellulose. Sodium hydroxide was added to achieve a pH of 11.8

Next, 250 g. of unmilled aspartame from the G.D. Searle Company was placed in the 2 qt. bowl of a Hobart mixer. The mixer was activated on the low speed and 100 g. of the modified zein solution was added in increments between 5 and 10 grams every 3 to 5 minutes with the mixer running. The damp mix which resulted was dustless and coalesced when squeezed. The damp mix was mixed for about 5 minutes after the last modified zein solution addition to insure complete interdispersion. The damp mix was transferred to stainless steel trays and spread to a depth of approximately 1 to 2 cm. At this point, the material was about 24 weight percent water, 72 weight percent aspartame, about 3.6 weight percent zein, and about 0.4 weight percent HPMC.

The loaded trays were placed in a conventional oven and heated to about 170° F. for 18 to 20 hours. After drying, the mix was ground in a Fitzmill at high speed using a 0.04 inch screen. The water content of the final product was 4.7 weight percent. The calculated aspartame content was about 90 weight percent. The calculated zein content was 4.6 weight percent. The calculated HPMC content was 0.7 weight percent. The particle size distribution wa similar to that described above.

Example 2 was performed the same as Example 1 with the exception that the modified zein solution had a lower concentration of zein and a higher concentration of HPMC. In particular, the solution was 7.8 weight percent zein and 4.0 weight percent HPMC. About 123 g. of this solution was added to 250 g. of unmilled aspartame as above. As a result, the damp mix contained 29 weight percent water, 67 weight percent aspartame, 2.6 weight percent zein, and 1.3 weight percent HPMC. The dried and ground particles contained 4.7 weight percent water. The calculated aspartame content was about 90 weight percent. The calculated zein content was 3.5 weight percent. The calculated HPMC content was 1.7 weight percent.

Example 3 was carried out similar to Example 2 except that ethanol was used as the solvent for the zein. In particular, the ethanol solution contained 23 weight percent zein and 2 weight percent Hydroxypropyl cellulose (HPC). About 123 g. of this ethanol solution was added to 250 g. of unmilled aspartame as above. As a result, the damp mix contained 25 weight percent ethanol, 67 weight percent aspartame, 7.6 weight percent zein, and 0.67 weight percent HPC. The dried and ground particles contained about 90 weight percent aspartame. The calculated zein content was 10.1 weight percent. The calculated HPMC content was 0.89 weight percent.

Comparative Example 4 was carried out similar to Example 1 with the exception that no water soluble modified cellulose compound was added to the aqueous zein solution. In particular, an aqueous solution with a pH of 11.8 and containing about 15 weight percent zein was prepared. About 123 g. of this solution was applied to 250 g. of unmilled aspartame as above. The resultant particles had a water content of 4.6 weight percent, an aspartame content of about 88.9 percent and a zein content of about 6.7 percent. The particle size distribution was similar to that described above.

Comparative Example 5 was performed similar to Example 3 with the exception that no water soluble modified cellulose compound was added to the ethanol zein solution.

The delayed release aspartame particles made in Examples 1, 3, 4, and 5 were incorporated into a chewing gum having the following formula:

| | |
|---|---|
| Gum base | 25.1% |
| Sorbitol | 45.0% |
| Xylitol | 15.0% |
| Mannitol | 4.0% |
| Glycerin | 9.0% |
| Cinnamon Flavor | 1.6% |
| Delayed Release Aspartame particles | 0.3 |

The gum base used was a conventional chewing gum base. The sorbitol was obtained from the Roquette Corporation. The mannitol was also obtained from the Roquette Corporation under the designation "Mannitol-F." The Xylitol was obtained from Finnsugar Biochemical, Inc. under the designation "Xylitol CM" (crystalline milled). The cinnamon flavor is a blend of natural and artificial flavors that contain about 75 weight percent cinamaldehyde.

Unidentified samples of the chewing gums so made were given to members of a panel of expert chewing gum tasters to evaluate whether or not the zein coated particles in each instance were perceptible during chewing. Members of the panel did detect grittiness in the chewing gums made with the particles produced in comparative Examples 4 and 5. Members of the panel reported a significant reduction in the grittiness in the chewing gums made with the particles produced in inventive Examples 1 and 3.

In summary, a relatively simple and inexpensive process has been described for producing chewing with delayed release high-potency sweeteners having a modified zein coating. Although specific embodiments and examples have been described herein, it should be born in mind that these have been provided by way of explanation and illustration and that the present invention is not limited thereby. Certainly modifications which are within the ordinary skill in the art to make are considered to lie within the scope of the invention as defined by the following claims, including all equivalents.

We claim:

1. A method for producing chewing gum with a delayed release high-potency sweetener comprising the following steps:
   providing a quantity of zein;
   providing a quantity of a water soluble modified cellulose compound, wherein the quantity of water soluble modified cellulose compound is between about 5 and about 40 percent by weight of the zein;
   providing a solvent for the zein;
   mixing the zein, the solvent, and the water soluble modified cellulose compound to produce a modified zein solution, wherein the solution comprises between about 1 and about 50 percent by weight zein;
   applying said solution to a high-potency sweetener followed by drying to produce delayed release sweetener particles coated with between about 1 and about 15 percent by weight zein, wherein the zein coating is softened by the inclusion of the water soluble modified cellulose compound; and
   adding said delayed release sweetener particles to a chewing gum formulation.

2. The method of claim 1 wherein the water soluble modified cellulose compound is selected from the group consisting of hydroxypropyl methylcellulose, and hydroxypropyl cellulose, as well as combinations thereof.

3. The method of claim 1 wherein the amount of water soluble modified cellulose compound is between about 10 and about 20 percent by weight of the zein.

4. The method of claim 1 wherein the high-potency sweetener selected from the group consisting of aspartame, alitame, salts of acesulfame, sucralose, saccharin and its salts, cyclamic acid and its salts, thaumatin, and monellin, as well as combinations thereof.

5. The method of claim 1 wherein the high-potency sweetener is a dipeptide sweetener selected from the group consisting of aspartame, alitame and combinations thereof.

6. The method of claim 1 wherein the high-potency sweetener is mixed with a bulking agent before being coated.

7. The method of claim 1 wherein the quantity of said solution added to the quantity of said powdered chewing gum ingredient is limited to thereby produce a damp mix which is dust free, non-flowing, and crumbly; and wherein said damp mix is dried and particle sized to produce the delayed release particles.

8. The method of claim 7 wherein the solvent is water having a pH of between about 11.5 and about 12.1.

9. The method of claim 8 wherein the aqueous solution of zein has a zein content between about 13 and about 18 percent by weight.

10. The method of claim 7 wherein the solvent is an alcohol.

11. The method of claim 7 wherein the solvent is ethanol.

12. The method of claim 11 wherein the ethanol solution of zein has a zein content between about 10 and about 50 percent by weight.

13. The method of claim 1 wherein the delayed release sweetener particles comprise between about 2 and about 7 weight percent zein.

14. The method of claim 1 wherein the delayed release sweetener particles comprises between about 70 and about 96 weight percent high-potency sweetener.

15. The method of claim 1 wherein a colorant is included in the modified zein solution.

16. A chewing gum made according to the method of claim 1.

17. A method for producing chewing gum with a delayed release high-potency sweetener comprising the following steps:
   providing a quantity of a powdered high-potency sweetener;
   mixing a quantity of zein with a water soluble modified cellulose compound and a solvent for the zein to produce a modified zein solution, wherein the amount of water soluble modified cellulose compound is between about 5 and about 40 percent by weight of the zein, and wherein the solution comprises between about 1 and about 50 percent by weight zein;
   mixing the quantity of powdered high-potency sweetener with a quantity of the modified zein solution, said quantity of the modified zein solution being limited to thereby produce a damp mix which is dust free, non-flowing, and crumbly;
   drying the damp mix; and
   particle sizing said dried mix to thereby obtain delayed release high-potency sweetener particles within a predetermined particle size range which particles are coated with between about 1 and about 15 percent by weight zein, wherein the zein coating is softened by the inclusion of the water soluble modified cellulose compound; and
   adding a quantity of said delayed release sweetener particles to a chewing gum formulation.

18. The method of claim 17 wherein the amount of water soluble modified cellulose compound is between about 10 and about 20 percent by weight of the zein.

19. The method of claim 17 wherein the water soluble modified cellulose compound is selected from the group consisting of hydroxypropyl methylcellulose and hydroxypropyl cellulose, as well as combinations thereof.

20. The method of claim 17 wherein the high-potency sweetener selected from the group consisting of aspartame, alitame, salts of acesulfame, sucralose, saccharin and its salts, cyclamic acid and its salts, thaumatin, and monellin, as well as combinations thereof.

21. The method of claim 17 wherein the high-potency sweetener is a dipeptide sweetener selected from the group consisting of aspartame, alitame and combinations thereof.

22. The method of claim 17 wherein the high-potency sweetener is mixed with a bulking agent before being coated.

23. The method of claim 17 wherein the solvent is water having a pH of between about 11.5 and about 12.1.

24. The method of claim 23 wherein the aqueous solution of zein has a zein content between about 13 and about 18 percent by weight.

25. The method of claim 17 wherein the solvent is ethanol.

26. The method of claim 25 wherein the ethanol solution of zein has a zein content between about 10 and about 50 percent by weight.

27. The method of claim 17 wherein the delayed release sweetener particles comprise between about 2 and about 7 weight percent zein.

28. The method of claim 17 wherein the delayed release sweetener particles comprises between about 70 and about 96 weight percent high-potency sweetener.

29. The method of claim 17 wherein a colorant is included in the modified zein solution.

30. A chewing gum made according to the method of claim 17.

31. A chewing gum with a delayed release high-potency sweetener comprising:

delayed release high-potency sweetener particles comprising high-potency sweetener coated with a combination of zein and water soluble modified cellulose compound wherein the water soluble modified cellulose compound is present at between about 5 and about 40 percent by weight of the zein, wherein the particles are coated with between about 1 and about 15 percent by weight zein, and wherein the zein coating is softened by the inclusion of the water soluble modified cellulose compound;

gum base; and a flavoring agent.

* * * * *